United States Patent [19]
Nakano et al.

[11] Patent Number: 5,446,739
[45] Date of Patent: Aug. 29, 1995

[54] RADIO COMMUNICATION SYSTEM

[75] Inventors: Motohiro Nakano, Ome; Masakazu Shirakawa, Kawasaki, both of Japan

[73] Assignee: Kabushiki Kaisha Toshiba, Kawasaki, Japan

[21] Appl. No.: 177,313

[22] Filed: Jan. 4, 1994

[30] Foreign Application Priority Data

Jan. 6, 1993 [JP] Japan .................. 5-000791

[51] Int. Cl.⁶ .......... H04B 7/212; H04B 7/26
[52] U.S. Cl. .................. 370/95.3; 379/59; 455/33.1
[58] Field of Search .......... 370/95.1, 95.3; 379/58, 379/59, 60, 63; 455/33.1, 33.2, 34.1, 34.2, 53.1, 54.1, 54.2, 56.1

[56] References Cited
U.S. PATENT DOCUMENTS

| | | | |
|---|---|---|---|
| 5,081,704 | 1/1992 | Umeda et al. | 370/95.3 |
| 5,166,929 | 11/1992 | Lo | 370/95.3 |
| 5,291,475 | 3/1994 | Bruckert | 370/95.3 |
| 5,295,140 | 3/1994 | Crisler et al. | 370/95.3 |
| 5,329,530 | 7/1994 | Kojima | 370/95.3 |

*Primary Examiner*—Wellington Chin
*Attorney, Agent, or Firm*—Finnegan, Henderson, Farabow, Garrett & Dunner

[57] ABSTRACT

Portable stations with a single receiver can perform communication using a plurality of slots in one frame in time division multiple access (TDMA) transmission. When communication is performed between one of the portable stations and a cell station with data of two 32 kbps data into which an exchange converts one 64 kbps data, the portable station occupies two slots in one TDMA frame. A controller of the cell station assigns these two slots as being separated from each other by at least one slot. Alternatively, the controller assigns these two slots as being adjacent to each other and assigns same carrier frequency to these slots. Thus, communication with a transmission rate of 63 kbps can be performed by using two slots or two channels of 32 kbps.

10 Claims, 12 Drawing Sheets

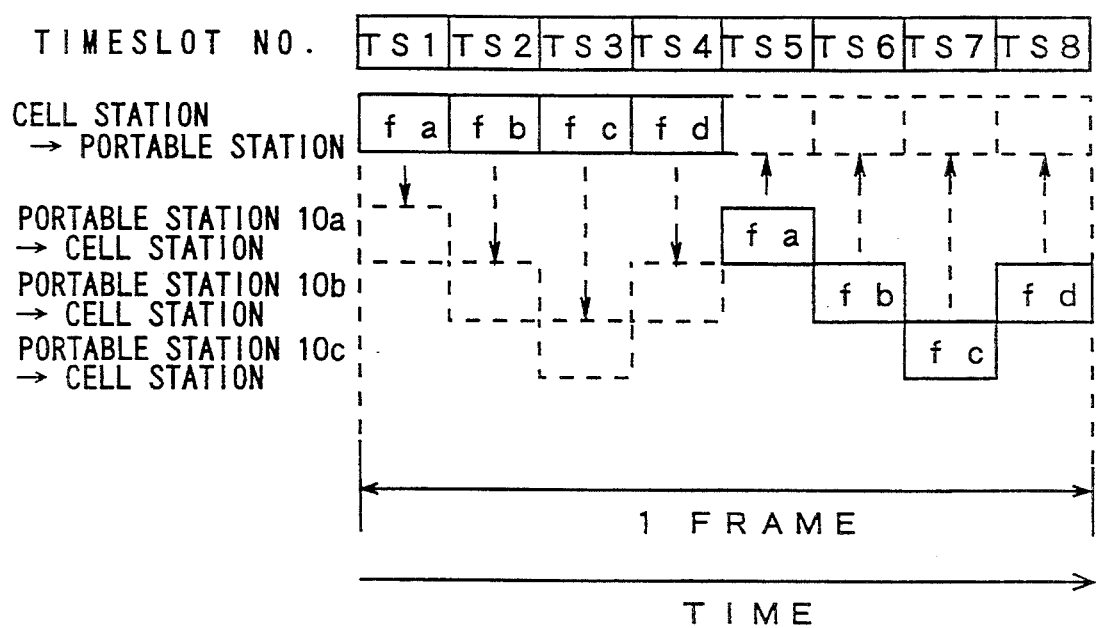
F I G. 2

| TIMESLOT NO. | TRANSMITTER → RECEIVER |
|---|---|
| TS1 | T20 → Ra |
| TS2 | T20 → Rb |
| TS3 | T20 → Rc |
| TS4 | T20 → Rb |
| TS5 | Ta → R21 |
| TS6 | Tb → R22 |
| TS7 | Tc → R21 |
| TS8 | Tb → R22 |

FIG. 3

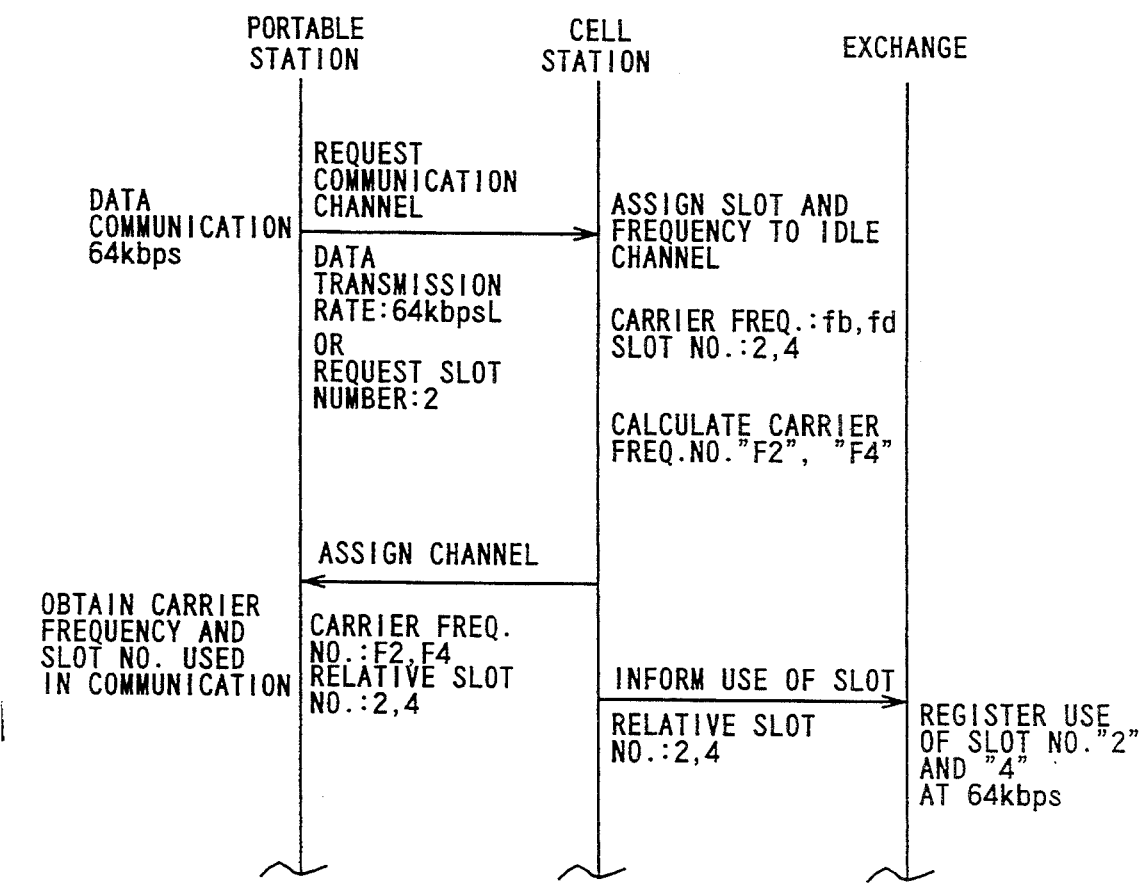
F I G. 5

| TIMESLOT NO. | TRANSMITTER → RECEIVER |
|---|---|
| TS1 | T20 → Ra |
| TS2 | T20 → Rb |
| TS3 | T20 → Rb |
| TS4 | T20 → Rc |
| TS5 | Ta → R21 |
| TS6 | Tb → R22 |
| TS7 | Tb → R21 |
| TS8 | Tc → R22 |

RADIO COMMUNICATION SYSTEM

BACKGROUND OF THE INVENTION

1. Field of the Invention

The present invention relates to radio communication systems such as cordless telephone communication systems in which communication is performed on the time division multiple access (TDMA) basis, and more particularly, to a radio communication system in which data is transmitted by means of a TDMA frame using a plurality of slots in the TDMA frame by properly assigning the slots and the carrier frequencies.

2. Description of the Related Art

In a radio communication system such as a cordless telephone system, recent trend is to change its transmission system from an analog transmission system to a digital transmission system. In the digital radio transmission system, TDMA is generally employed because of its good transmission efficiency.

In a zone area where digital radio communication is performed between a plurality of cell stations and a multiplicity of portable stations, it is necessary to use a plurality of carrier frequencies for both the cell stations and the portable stations.

When a different carrier frequency is assigned for each slot in the TDMA frame at a cell station, a receiver of the cell station may not be able to follow the change in the carrier frequencies from one slot to another. In order to follow the carrier frequency change, the cell station is provided with two or more receivers which are sequentially selected to receive respective slots.

For the portable stations, usually it is sufficient to be provided with a single receiver since one of the slots is usually used in a TDMA frame.

However, when a portable station uses a plurality of slots in a TDMA frame, it must be provided with two or more receivers. Thus, the portable station cannot be light-weighted and small-sized, and has a complicated circuit arrangement.

Further, since there are a number of the portable stations in the zone area, the radio communication system becomes very costly.

SUMMARY OF THE INVENTION

It is an object of the present invention to provide a radio communication system capable of performing communication using a plurality of slots in one TDMA frame by a portable station having a single receiver.

In the first aspect of the invention, the above object is attained by providing a radio communication system for performing communication between a cell station and a plurality of portable stations on a time division multiple access basis using a plurality of carrier frequencies and a plurality of slots in one frame, wherein the cell station includes control means for assigning plural slots in one frame such as to be spaced from each other by one slot or more when the cell station communicates with one of the portable stations using the plural slots in one frame.

In the second aspect of the invention, there is provided a radio communication system for performing communication between a cell station and a plurality of portable stations on a time division multiple access basis using a plurality of carrier frequencies and a plurality of slots in one frame, wherein the cell station includes control means for assigning plural slots in one frame such that the plural slots are positioned adjacent to each other and use same carrier frequency when the cell station communicates with one of the portable stations using the plural slots in one frame.

According to the first aspect of the invention, since the portable station with a single receiver can perform communication using a plurality of slots in a frame, the portable station becomes small and light, its circuit configuration becomes simplified, and the cost of the system can be reduced.

According to the second aspect of the invention, since the portable station with a single receiver can perform communication using a plurality of slots in a frame in which the number of carrier frequencies is equal to the number of portable stations, effective frequency band utilization can be realized. Further, by positioning the plurality of slots adjacent to each other, slots can be effectively occupied in the frame.

BRIEF DESCRIPTION OF THE DRAWINGS

FIG. 2 is a timing chart showing an arrangement of the time slots in the radio communication system in FIG. 1;

FIG. 3 shows a relationship between transmitters and receivers when time slot assignment in FIG. 2 is effected;

FIG. 5 is a diagram for explaining the assignment procedure of two slots and carrier frequencies when the two of slots in a frame is used;

FIG. 8 shows a relationship between transmitters and receivers when time slot assignment in FIG. 7 is effected;

DESCRIPTION OF THE PREFERRED EMBODIMENTS

Embodiments of the present invention will be described by referring to the accompanying drawings.

Figure 1:
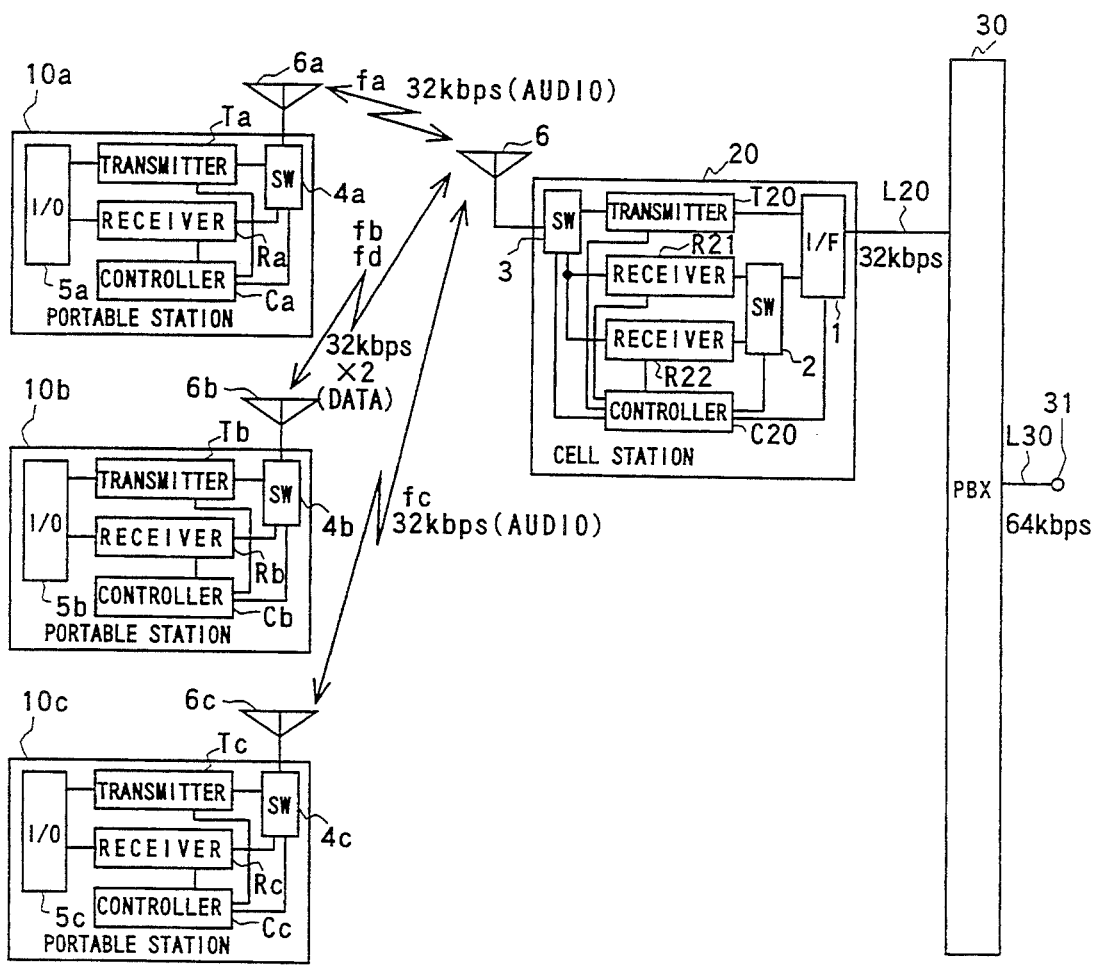
FIG. 1 illustrates an arrangement of a radio communication system in accordance with the first embodiment of the present invention.

Referring to FIG. 1, the radio communication system of the first embodiment is operated on a time division multiple access-4-time division duplex (TDMA-4TDD) bases. As will be described later, one frame is divided into eight time slots so that four channels can be used for data transmission and reception, respectively.

The radio communication system comprises an exchange (PBX) 30, a cell station 20 connected to the exchange 30 by a wire line and portable stations 10a to 10c connected to the cell station 20 by radio channels.

The exchange 30 performs switching and connecting of transmitting and receiving data, and has a function of converting through compression or separation data of a transmission rate of 64 kbps inputted at an input/output terminal 31 from a wired line of a network (not shown) into data of a transmission rate of 32 kbps according to the type of the data and outputting the converted data onto a transmission line L20 of a transmission rate of 32 kbps, and a function of converting through expansion or combination data of a transmission rate of 32 kbps receive from the transmission line L20 into data of a transmission rate of 64 kbps according to the type of the data and outputting the converted data onto a transmission line L30 of a transmission rate of 64 kbps.

The cell station 20 includes an input/output interface 1, switches 2 and 3, an antenna 6, a transmitter T20, a controller C20 and receivers R21 and R22. The cell station 20 inputs data of a transmission rate of 32 kbps through the transmission line L20 from the exchange 30 via the input/output interface 1. Under the control of the controller C20, the transmitter T20 generates a radio frequency signal including transmission data assigned to a time slot of a predetermined position in a frame according to the type of the data, and transmits the radio frequency signal through the switch 3 and the antenna 6.

The radio frequency signal transmitted through the switch 3 and the antenna 6 is inputted to the receiver R21 and the receiver R22. Under the control of the controller C20, the receiver R21 and the receiver R22 alternately receive the radio frequency signal corresponding to a frequency switching by a synthesizer (not shown) and the switch 2. The received radio frequency signal is demodulated at the receivers R21 and R22 into a reception data which is assigned to a predetermined time slot, and is outputted to the exchange 30 through the switch 2, the interface 1 and the transmission line L20.

The controller C20 of the cell station 20 controls the switch 3 so that the transmitter T20 is connected to the antenna 6 in the transmission mode and the receivers R21 and R22 are connected to the antenna 6 in the reception mode. Further, the controller C20 performs the controls on carrier frequencies generated by synthesizers of the transmitter T20 and the Receivers R21 and R22 and time slot arrangements as well as ordinary transmit/receive control. Furthermore, the controller C20 controls the switching of the switch 2 and generates control data between the cell station 20 and the portable stations 10a to 10c and between the cell station 20 and the exchange 30.

The portable stations 10a to 10c respectively include switches 4a to 4c, input/output circuits 5a to 5c, antennas 6a to 6c, receivers Ra to Rc, transmitters Ta to Tc and controllers Ca to Cc. The receivers Ra to Rc respectively receive only the radio frequency signal in the time slot assigned thereto under control of controllers Ca to Cc among the radio frequency signal transmitted from the cell station 20 via the antennas 6a to 6c and the switches 4a to 4c, and demodulate the received radio frequency signal into a reception signal and output the reception signal to the input/output circuits 5a to 5c.

Transmitters Ta to Tc respectively modulate transmission data inputted through the input/output circuits 5a to 5c so as to generate a radio frequency signal and transmit the radio frequency signal through the switches 4a to 4c and the antennas 6a to 6c at timing when a time slot therefor is assigned.

The controllers Ca to Cc respectively control the switches 4a to 4c so that the transmitters Ta to tc are respectively connected to the antennas 6a to 6c in the transmission mode and the receivers Ra to Rc are respectively connected to the antennas 6a to 6c in the reception mode. Further, the controllers Ca to Cc respectively perform the controls on carrier frequencies Generated by synthesizers of the transmitters Ta to Tc and the Receivers Ra to Rc and on transmission timing as well as ordinary transmit/receive control. Furthermore, the controllers Ca to Cc Generate control data between the portable stations 10a to 10c and the cell station 20.

It is assumed that the receivers R21 and R22 of the cell station 20 as well as the receivers Ra to Rc of the portable stations 10a to 10c can receive data transmitted in different carrier frequencies within a transient time of one time slot, but cannot receive data of continuous time slots having different carrier frequencies. For this reason, the two receivers are provided in the cell station 20 so as to be alternately used for receiving data of continuous time slots having different carrier frequencies.

Further, it is assumed that communication can be performed at 32 kbps with a single time slot.

Fig. 1 shows the case where audio data communication is performed between the cell station 20 and the portable stations 10a and 10c at a transmission rate of 32 kbps by using a single time slot, while non-audio data communication is performed between the cell station 20 and the portable station 10b at a transmission rate of 64 kbps by using two time slots (two communication channels) in one frame.

FIG. 2 is a timing chart illustrating a time slots arrangement in the embodiment of FIG. 1 in which one frame is made up of eight time slots TS1 to TS8 and four different carrier frequencies fa to fd are used. More in detail, the carrier frequency fa is used for the communication between the cell station 20 and the portable station 10a; the carrier frequency fc is between the cell station 20 and the portable station 10c; and the two carrier frequencies fb and fd are between the cell station 20 and the portable station 10b.

Since a single receiver in the portable station 10b cannot receive data of two continuous time slots having different carrier frequencies, these two time slots are assigned such that the portable station will not receive continuous time slots. Thus, these two time slots are spaced with least by one time slot interval therebetween. This assignment is carried out under control of the controller C20 of the cell station 20.

With this time slot assignment, the portable station having a single receiver (which is desirable from the viewpoint of light weight and small size) can communicate with two or more time slots in one frame.

FIG. 3 shows assignment between the transmitters and receivers for the time slot assignment of FIG. 2.

Referring to FIG. 3, description will be made in the order of the time slots TS1 to TS8. First, at the time slot TS1, data of the carrier frequency fa is transmitted from the transmitter T20 of the cell station 20 and received by the receiver Ra of the portable station 10a. At the time slot TS2, data of the carrier frequency fb is transmitted from the transmitter T20 of the cell station 20 and received by the receiver Rb of the portable station 10b. At the time slot TS3, data of the carrier frequency fc is transmitted from the transmitter T20 of the cell station 20 and received by the receiver Rc of the portable station 10c. At the time slot TS4, data of the carrier frequency fd is transmitted from the transmitter T20 of the cell station 20 and received by the receiver Rb of the portable station 10b.

At the time slot TS5, data of the carrier frequency fa is transmitted from the transmitter Ta of the portable station 10a and received by the receiver R21 of the cell station 20, at the time slot TS6, data of the carrier frequency fb is transmitted from the transmitter Tb of the portable station 10b and received by the receiver R22 of the cell station 20, at the time slot TS7, data of the carrier frequency fc is transmitted from the transmitter Tc of the portable station 10c and received by the receiver R21 of the cell station 20 and at the time slot TS8, data of the carrier frequency fd is transmitted from the transmitter Tb of the portable station 10b and received by the receiver R22 of the cell station 20.

As described above, the receiver Rb of the portable station 10b switches its receiving frequencies such that it can receive the data of the carrier frequencies fb and fd corresponding to the time slots TS2 and TS4, while the receivers R21 and R22 of the cell station 20 switches their receiving frequencies within the transient time interval of one time slot and are alternately used so that they can receive continuously arriving data of different carrier frequencies.

Description will next be made as to the assignment procedure between a slot and a carrier frequency. The term 'slot' refers to a pair of time slots to be used in transmission and reception.

Figure 4:
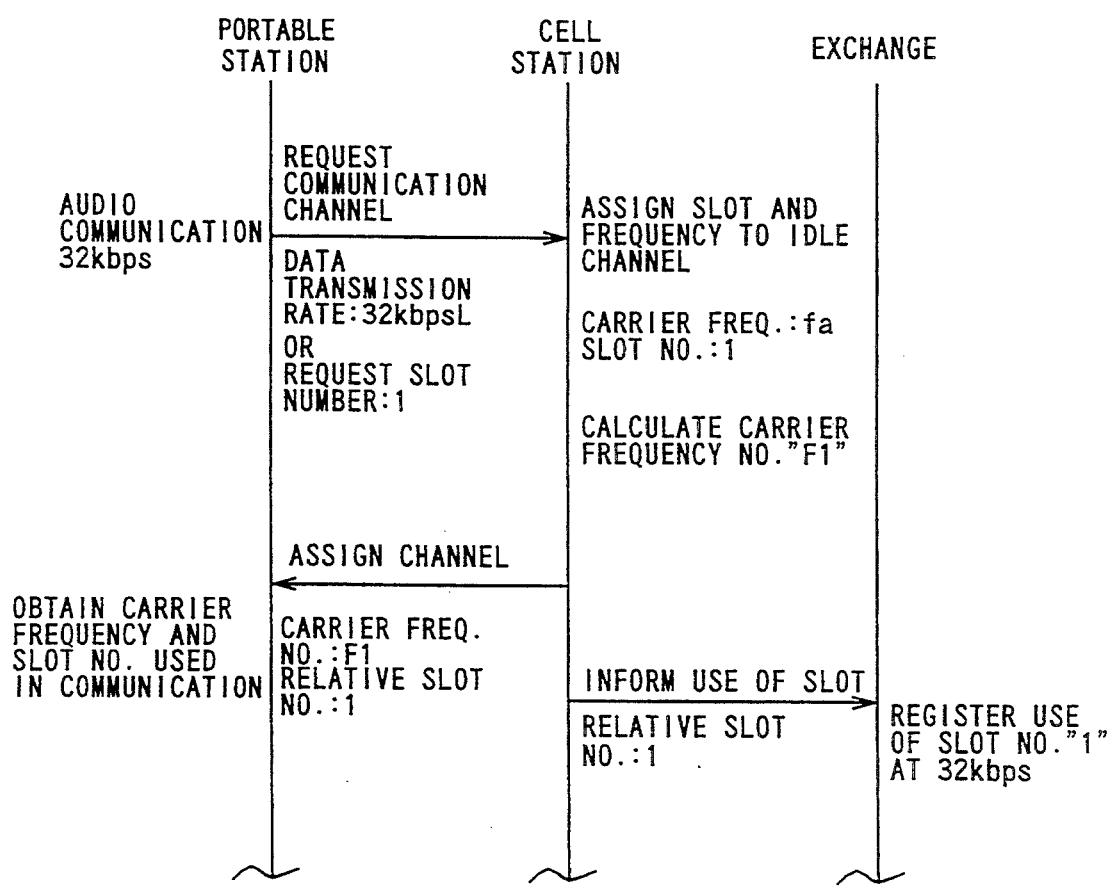
FIG. 4 is a diagram for explaining the assignment procedure of a slot and a carrier frequency when the one of slots within a frame is used.

FIG. 4 shows an assignment procedure between the slot and carrier frequency when one slot is used in a frame. In this embodiment, audio communication is carried out at a transmission rate of 32 kbps, and the assignment is made for the portable station 10a.

Referring to FIG. 4, the portable station 10a issues a communication channel request to the cell station 20 at a transmission rate of 32 kbps or with a request slot number of "1".

In response to the channel request from the portable station, the cell station 20 assigns a slot and a carrier frequency of an idle communication channel. That is, the cell station 20 assigns a relative slot number "1" (a pair of time slots TS1 and TSb) and the carrier frequency "fa" to the portable station 10a. The cell station 20 extracts a frequency number "F1". corresponding to the predetermined carrier frequency "fa" or calculates the frequency number from a predetermined intervals from a reference carrier frequency, transmits data corresponding to the relative slot number "1" and the carrier frequency number "F1" to the portable station 10a, thereby to assign a communication channel.

The cell station 20 also informs the exchange 30 of the fact that the single relative slot number "1" and a transmission rate of 32 kbps are to be used.

With the above operations, the portable station 10a knows that the relative slot number is "1" and carrier frequency to be used is "fa" and sets itself accordingly. Meanwhile, the exchange 30 registers that the single relative slot number "1" of the cell station 20 is used at a transmission rate of 32 kbps.

Description will now be made as to the case where two slots are used in a frame. This is the case of data communication at a transmission rate of 64 kbps.

FIG. 5 shows the assignment procedure of the slots and carrier frequencies when two slots are used in a frame. In this embodiment, the assignment procedure is done to the portable station 10b.

Referring to FIG. 5, the portable station 10b issues a communication channel request to the cell station 20 with transmission rate of 64 kbps or request slot number of "2".

In response to the channel request, the cell station 20 assigns slots and carrier frequencies to idle communication channels. More particularly, the cell station 20 assigns to the portable station 10b a relative slot number "2" (a pair of time slots TS2 and TS6) and a relative slot number "4" (a pair of time slots TS4 and TS8) as well as the carrier frequencies "fb" and "fd" corresponding to these relative slot numbers. Then, the cell station 20 extracts frequency numbers "F2" and "F4" corresponding to the carrier frequencies "fb" and "fd" or calculates them from the predetermined frequency intervals from the reference carrier frequency, transmits to the portable station 10b data corresponding to the relative slot numbers "2" and "4" and also corresponding to the carrier frequency numbers "F2" and "F4", thereby to assign communication channels.

The cell station 20 informs the exchange 30 that the relative slot numbers "2" and "4" in pair and a transmission rate of 64 kbps are to be used.

As a result, the portable station 10b knows that the relative slot numbers "2" and "4" and carrier frequencies "fb" and "fd" are to be used and sets itself accordingly. Meanwhile, the exchange 30 registers that the paired relative slot numbers "2" and "4" of the cell station 20 are used at a transmission rate of 64 kbps.

The controller C20 of the cell station 20 assigns non-adjacent slots and respective carrier frequencies therefor in the above-described manner. Thus, even when two slots are used in a frame, the portable station can perform communication with a single receiver.

For an access from the exchange 30, the cell station 20 assigns a communication channel without receiving a communication channel request from the portable station.

In this embodiment, a multiplexing degree of 4 or four slots have been used. When the multiplexing degree increases and the number of slots within one frame is increased, there will be a case in which three or more non-adjacent slots are used in one frame. For example, for a multiplexing degree of 5, the slot numbers 1, 3 and 5 are used so that the portable station can perform communication by using the maximum three slots.

Figure 6:
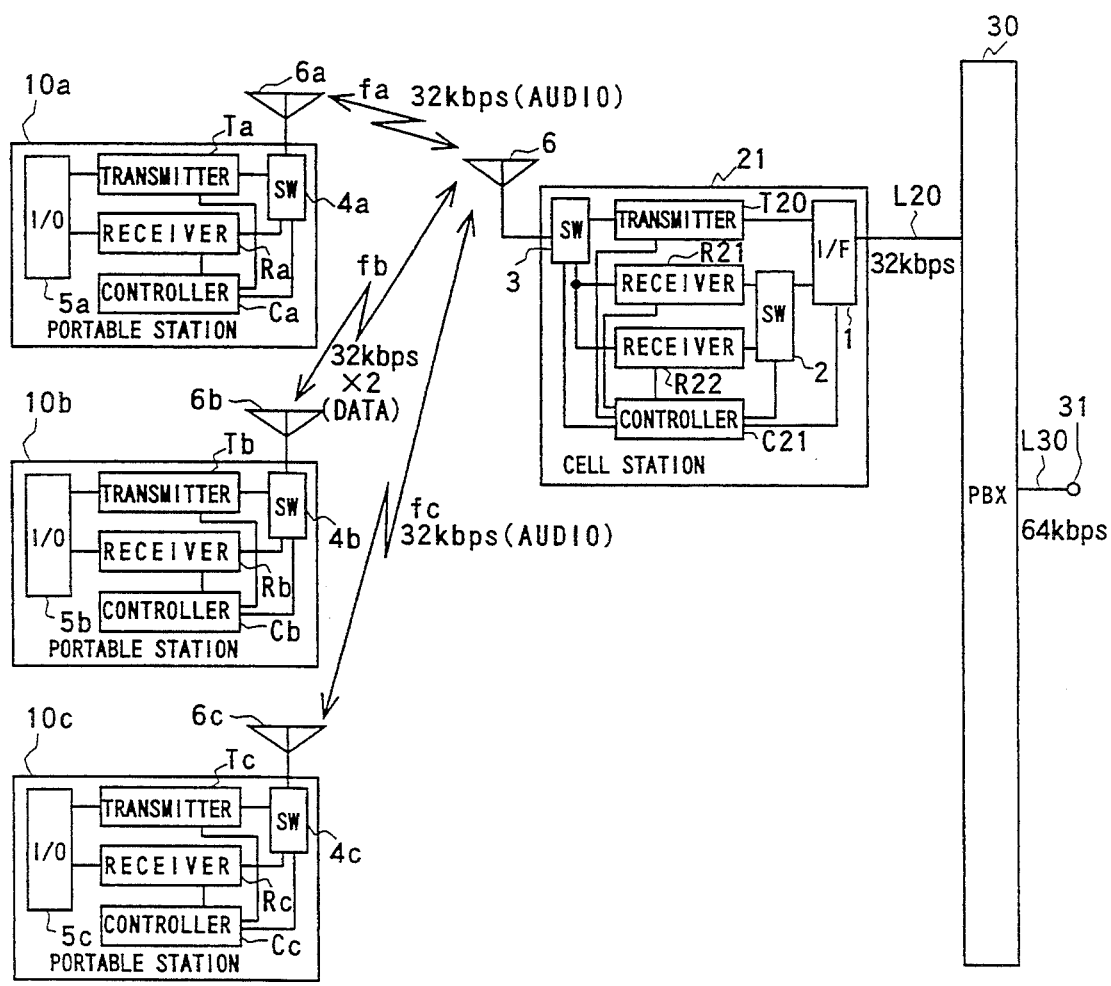
FIG. 6 is a block diagram of an arrangement of a radio communication system in accordance with a second embodiment of the present invention.

FIG. 6 illustrates an arrangement of a radio communication system in accordance with the second embodiment of the present invention. As in the first embodiment, the radio communication system of FIG. 6 employs TDMA-4TDD. One frame is divided into 8 time slots so that four channels are used for transmission and reception, respectively. For convenience of description, portions having the same construction as those in FIG. 1 are denoted by the same reference numerals in FIG. 6.

The radio communication system of FIG. 6 comprises an exchange (PBX) 30, a cell station 21 and portable stations 10a to 10c connected to the cell station 21 by radio channels. The exchange 30 performs switching and connecting of transmitting and receiving data, and has a function of converting through compression or separation data of a transmission rate of 64 kbps inputted at an input/output terminal 31 from a wired line of a network (not shown) into data of a transmission rate of 32 kbps according to the type of the data and outputting the converted data onto a transmission line L20 of a transmission rate of 32 kbps, and a function of converting through expansion or combination data of a transmission rate of 32 kbps receive from the transmission line L20 into data of a transmission rate of 64 kbps according to the type of the data and outputting the converted data onto a transmission line L30 of a transmission rate of 64 kbps.

The cell station 21 includes an input/output interface 1, switches 2 and 3, an antenna 6, a transmitter T20, a controller C21 and receivers R21 and R22. The cell station 21 inputs data of a transmission rate of 32 kbps through the transmission line L20 from the exchange 30 via the input/output interface 1. Under the control of the controller C21, the transmitter T20 generates a radio frequency signal including transmission data assigned to a time slot of a predetermined position in a frame according to the type of the data, and transmits the radio frequency signal through the switch 3 and the antenna 6.

The radio frequency signal transmitted through the switch 3 and the antenna 6 is inputted to the receiver R21 and the receiver R22. Under the control of the controller C21, the receiver R21 and the receiver R22 alternately receive the radio frequency signal corresponding to a frequency switching by a synthesizer (not shown) and the switch 2. The received radio frequency signal is demodulated at the receivers R21 and R22 into a reception data which is assigned to a predetermined time slot, and is outputted to the exchange 30 through the switch 2, the interface 1 and the transmission line L20.

The controller C21 of the cell station 21 controls the switch 3 so that the transmitter T20 is connected to the antenna 6 in the transmission mode and the receivers R21 and R22 are connected to the antenna 6 in the reception mode. Further, the controller C21 performs the controls on carrier frequencies generated by synthesizers of the transmitter T20 and the Receivers R21 and R22 and time slot arrangements as well as ordinary transmit/receive control. Furthermore, the controller C21 controls the switching of the switch 2 and generates control data between the cell station 21 and the portable stations 10a to 10c and between the cell station 21 and the exchange 30.

The portable stations 10a to 10c respectively include switches 4a to 4c, input/output circuits 5a to 5c, antennas 6a to 6c, receivers Ra to Rc, transmitters Ta to Tc and controllers Ca to Cc. The receivers Ra to Rc respectively receive only the radio frequency signal in the time slot assigned thereto under control of controllers Ca to Cc among the radio frequency signal transmitted from the cell station 21 via the antennas 6a to 6c and the switches 4a to 4c, and demodulate the received radio frequency signal into a reception signal and output the reception signal to the input/output circuits 5a to 5c.

Transmitters Ta to Tc respectively modulate transmission data inputted through the input/output circuits 5a to 5c so as to generate a radio frequency signal and transmit the radio frequency signal through the switches 4a to 4c and the antennas 6a to 6c at timing when a time slot therefor is assigned.

The controllers Ca to Cc respectively control the switches 4a to 4c so that the transmitters Ta to tc are respectively connected to the antennas 6a to 6c in the transmission mode and the receivers Ra to Rc are respectively connected to the antennas 6a to 6c in the reception mode. Further, the controllers Ca to Cc respectively perform the controls on carrier frequencies generated by synthesizers of the transmitters Ta to Tc and the Receivers Ra to Rc and on transmission timing as well as ordinary transmit/receive control. Furthermore, the controllers Ca to Cc generate control data between the portable stations 10a to 10c and the cell station 21.

It is assumed that the receivers R21 and R22 of the cell station 21 as well as the receivers Ra to Rc of the portable stations 10a to 10c can receive data transmitted in different carrier frequencies within a transient time of one time slot, but cannot receive data of continuous time slots having different carrier frequencies. For this reason, the two receivers are provided in the cell station 21 so as to be alternately used for receiving data of continuous time slots having different carrier frequencies.

FIG. 6 shows the case where audio communication is performed between the cell station 21 and the portable stations 10a and 10c at a transmission rate of 32 kbps using a single time slot, while date communication is performed between the cell station 21 and the portable station 10b at a transmission rate of 64 kbps using two time slots (two communication channels) in one frame.

Figure 7:
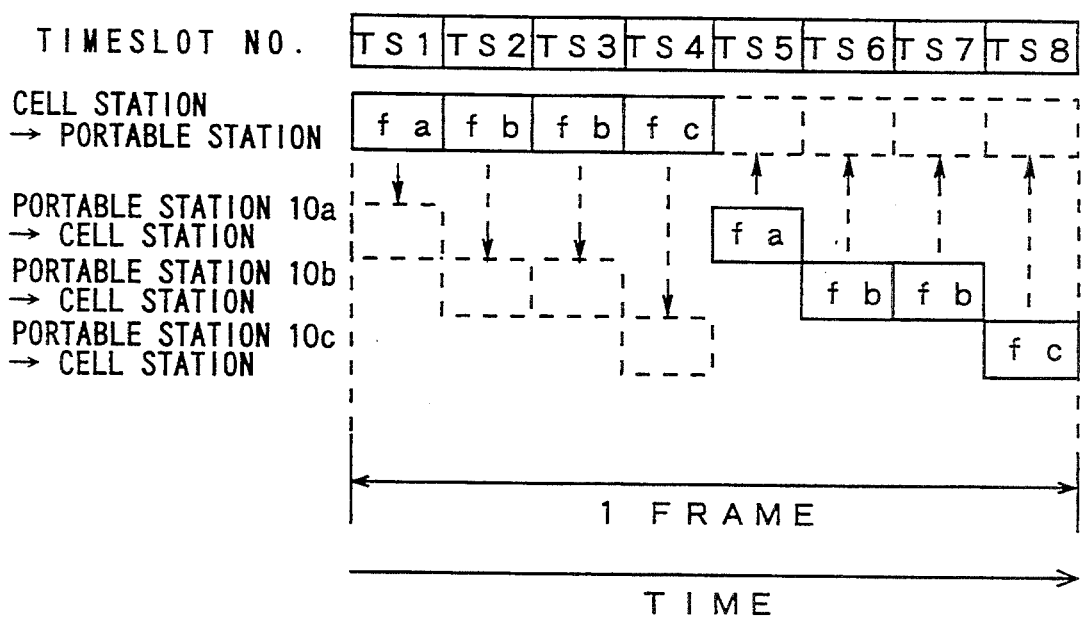
FIG. 7 is a timing chart showing a time slots arrangement in FIG. 6.

FIG. 7 is a timing chart illustrating a time slots arrangement in the embodiment of FIG. 6 in which one frame is made up of eight time slots TS1 to TS8. Carrier frequencies to be used are three different carrier frequencies fa to fc.

More in detail, the carrier frequency fa is used for the communication between the cell station 21 and the portable station 10a, the carrier frequency fc is between the cell station 21 and the portable station 10c and the two carrier frequency fb is between the cell station 21 and the portable station 10b. Since the portable station 10b cannot receive data of continuous time slots having different carrier frequencies due to the ability of the single receiver, time slots are assigned in such a manner that continuous time slots have the same carrier frequency, i.e., adjacent time slots have the same carrier frequency.

FIG. 8 shows an assignment between the transmitters and receivers when the time slot assignment of FIG. 7 is effected. In FIG. 8, description will be made in the order of the time slots TS1 to TS8. First, the time slot TS1, data of the carrier frequency fa is transmitted from the transmitter T20 of the cell station 21 and received by the receiver Ra of the portable station 10a. At the time slot TS2, data of the carrier frequency fb is transmitted from the transmitter T20 of the cell station 21 and received by the receiver Rb of the portable station 10b. At the time slot TS3, data of the carrier frequency fb is transmitted from the transmitter T20 of the cell station 21 and received by the receiver Rb of the portable station 10b. At the time slot TS4, data of the carrier frequency fc is transmitted from the transmitter T20 of the cell station 21 and received by the receiver Rc of the portable station 10c.

At the time slot TS5, data of the carrier frequency fa is transmitted from the transmitter Ta of the portable station 10a and received by the receiver R21 of the cell station 21, at the time slot TS6, data of the carrier frequency fb is transmitted from the transmitter Tb of the portable station 10b and received by the receiver R22 of the cell station 21, at the time slot TS7, data of the carrier frequency fb is transmitted from the transmitter Tb of the portable station 10b and received by the receiver R21 of the cell station 21, and at the time slot TS8, data of the carrier frequency fc is transmitted from the transmitter Tc of the portable station 10c and received by the receiver R22 of the cell station 21.

As described above, the receiver Rb of the portable station 10b receives data in the time slots TS2 and TS3 at the carrier frequency fb, while the receivers R21 and R22 of the cell station 21 switch their receiving frequencies within the transient time of one time slot so that the receivers are alternately used and thus can receive continuously arriving data of different carrier frequencies.

Description will next be made as to the assignment procedure between the slot and carrier frequency. The assignment of the slot and carrier frequency when one slot is used in a frame is the same as in FIG. 4. Accordingly, description will be made as to the case where two slots are used in a frame, i.e., when data communication is carried out at a transmission rate of 64 kbps.

Figure 9:
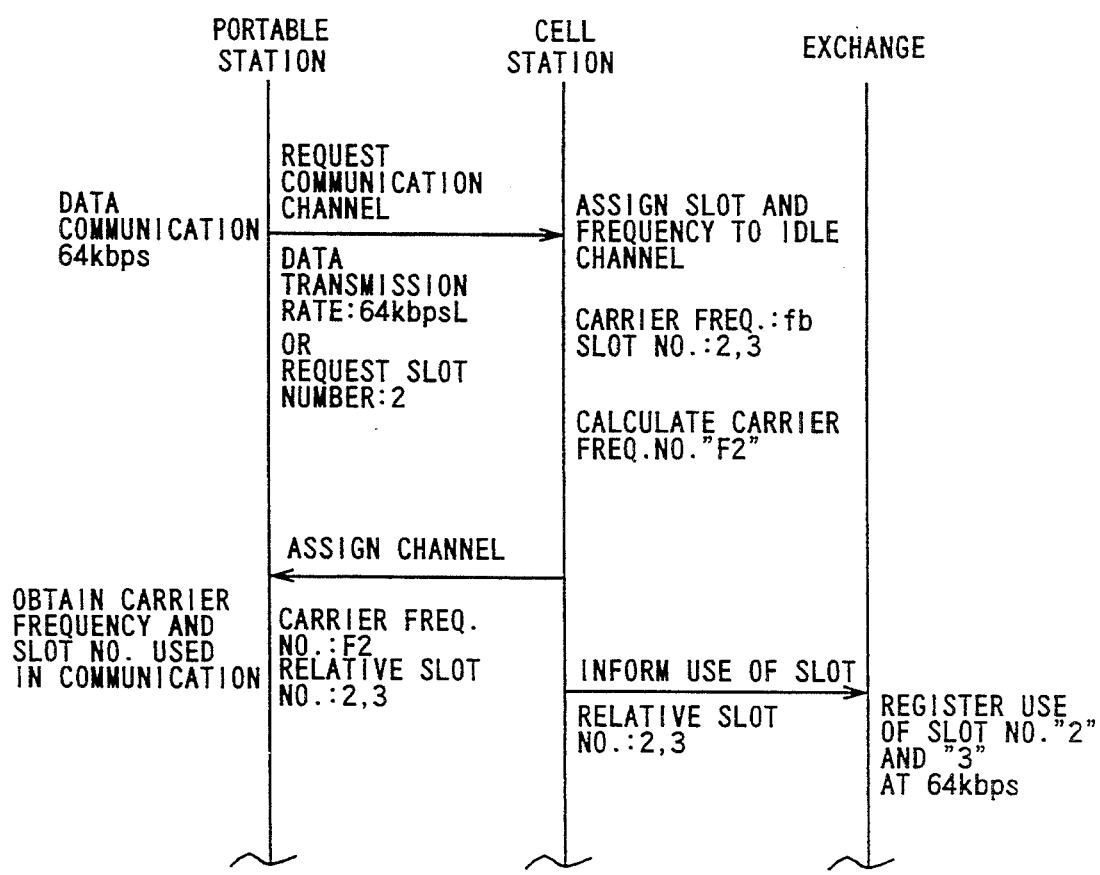
FIG. 9 is a diagram for explaining the assignment procedure of two slots and carrier frequencies when the two of slots in a frame is used.

FIG. 9 shows the assignment procedure between the slots and carrier frequencies when two slots are used in a frame. This applies to the assignment procedure for the portable station 10b.

Referring to FIG. 9, the portable station 10b issues a communication channel request to the cell station 21 at a transmission rate of 64 kbps or a request slot number of "2".

In response to the communication channel request, the cell station 21 assigns slots and carrier frequencies to idle communication channels. That is, the cell station 21 assigns to the portable station 10b a relative slot number "2" (a pair of time slots TS2 and TS6) and a relative slot number "3" (a pair of time slots TS3 and TS7) as well as the carrier frequency "fb". The cell station 21 extracts a frequency number "F2" for the predetermined carrier frequency "fb" or calculates it from the predetermined frequency interval in the reference carrier frequency, transmits to the portable station 10b data corresponding to the relative slot numbers "2" and "3" and also corresponding to the carrier frequency number "F2" thereof for assignment of a communication channel.

The cell station 21 informs the exchange 30 of the fact that the relative slot numbers "2" and "3" in pair and a transmission rate of 64 kbps are to be used.

Thus, the portable station 10b knows that the relative slot numbers "2" and "3" and carrier frequency "fb" are to be used and sets these values. Meanwhile, the exchange 30 registers that a pair of relative slot numbers "2" and "3" of the cell station 21 is used at a transmission rate of 64 kbps.

In this manner, even when two slots are used in a frame, since the carrier frequency is the same in these two slots, the controller C21 of the cell station 21 assigns adjacent slots with the same carrier frequency. Thus, the portable station can perform communication by a single receiver without switching frequencies for signal reception.

As above described, in the second embodiment, like the first embodiment, the portable station performs communication with a single receiver, and has substantially the same effects as the first embodiment by using a less number of carrier frequencies. In addition, when the multiplexing degree is the same, the second embodiment can occupy a large number of slots compared with the first embodiment.

For an access from the exchange 30, the cell station 21 can assign communication channels without receiving a communication channel request from the portable station.

Although description has been made in the case where two slots are used in a frame in this embodiment, three or more slots can also be used in a frame. In this case, the controller C21 of the cell station 21 assigns adjacent time slots corresponding to the occupied slot number and the same carrier frequency to the adjacent time slots.

In the above embodiments, the case where multiplexing degree of 4 or four slots in one frame is described. However, the above description can be applied to the case where the multiplexing degree is increased so as to increase the number of slots within one frame.

In the above embodiments, communication between the cell station 20 or 21 and the exchange 30 is carried out at a transmission rate of 32 kpbs, Communication between the cell station 20 or 21 and portable stations 10a to 10c are basically carried out at a transmission rate of 32 kbps. On the other hand, communication between the exchange 30 and the network (not shown) is carried out at a transmission rate of 64 kbps. Thus, the exchange 30 performs converting operation between 64 kbps data and 32 kbps data through the compression/expansion or separation/combination of data according to the type of the data.

Usually, conversion is carried out by separation or combination. For example, data is converted into 64 kbps data by combining two channels of 32 kbps.

For audio data, however, missing of some of the information can be ignored. Such partially missed audio data can be satisfactorily used as audio data. In particular, recently-developed audio compression technique makes it possible to perform effective compression over the audio data. For example, when an adaptive differential pulse code modulation (ADPCM) system is employed, compressed audio data of 32 kbps can be obtained. In non-audio data communication, on the other hand, missing of even one data may cause a serious error. To avoid this, the data separation/combination is carried out for non-audio data. For example, two 32 kbps channels are combined to realize a 64 kbps channel.

Description will now be made as to the operation of the exchange 30 which performs the conversion of transmission rate.

Figure 10:
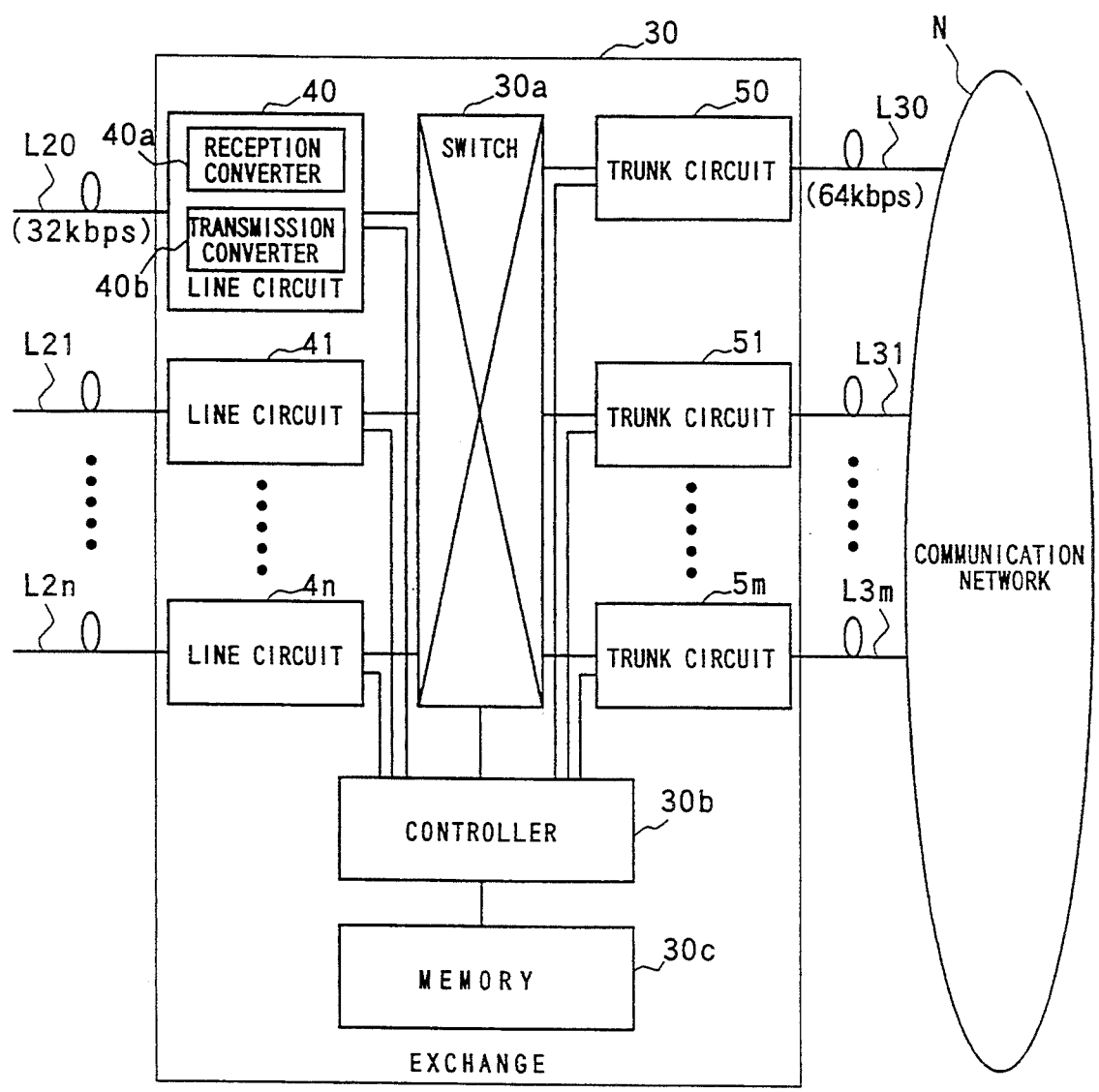
FIG. 10 is a block diagram of an exchange.

Referring to FIG. 10, the exchange 30 comprises a switch 30a, a plurality of line circuits 40-4n, a plurality of trunk circuits 50-5m, a controller 30b for controlling the switch 30a, the line circuits 40-4n and the trunk circuits 50-5m and a memory 30c for storing data required to control the controller 30b.

The line circuits 40-4n are connected to extensions L20-L2n, respectively and serve as extension interfaces. The trunk circuits 50-5m are connected to a network N through office lines L30-L3m. The extension L20 shows the extension L20 in FIG. 1 and the office line L30 shows the office line L30 in FIG. 1. Therefore, the transmission bandwidth of a communication channel transmitted to the extension L20 is 32 kbps and the transmission bandwidth of a communication channel transmitted to the office line L30 is 64 kbps.

The line circuit 40 is connected to the cell station 20 or 21. Under the switching control of the controller 30b, the line circuit 40 is connected to the trunk circuits 50- 5m and in turn is connected to a wired line (not shown) in the network N or connected to another portable station which is connected to the network N.

Further, the line circuit 40 is connected through extension-connection to the line circuits 41-4n. Therefore, if the line circuit 41 is provided with a cell station similar to the cell station 20 or 21, the cell station for the line circuit 41 and the cell station 20 or 21 are connected through extension so that these two cell stations can communicate with each other. In that occasion, no transmission rate conversion is necessary.

The line circuit 40 includes a reception converter 40a and a transmission converter 40b for performing transmission rate conversion of a switched communication channel.

Figure 11:
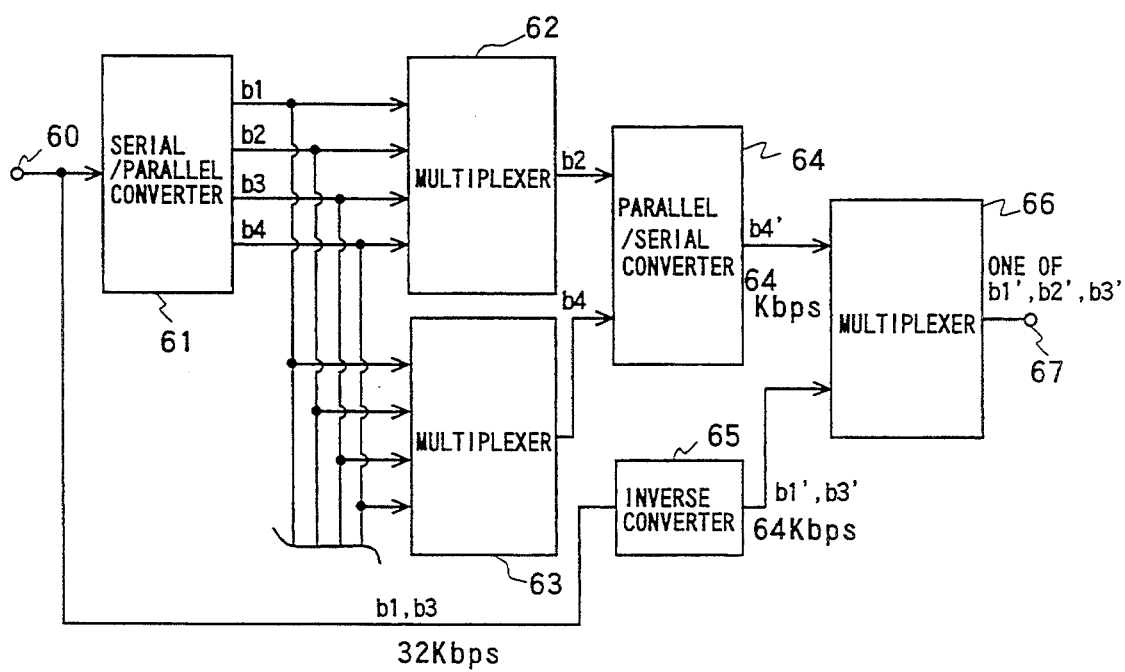
FIG. 11 illustrates a structure of a reception converter for converting data received from a cell station of a private branch exchange.

FIG. 11 shows a structure of the reception converter 40b for converting data received from the cell station side of the exchange 30. In FIG. 11, input data b1 to b4 (32 kbps non-audio data b2 and b4 and 32 kbps audio data b1 and b3) received from an input terminal 60 are converted at a serial/parallel converter 61 into parallel data. The 32 kbps data b2 and b4 of the parallel data are selected and extracted at multiplexers 62 and 63 respectively. The extracted data b2 and b4 are applied as parallel data to a parallel/serial converter 64 which outputs 64 kbps serial data b2′ corresponding to the combination of the data b2 and b4.

Of the input data b1 to b4 received from the input terminal 60, the 32 kbps audio data b1 and b3 are applied to an inverse converter 65 where the input audio data b1 and b3 are converted into 64 kbps audio data b1′ and b3′ that are issued therefrom as its outputs.

The 64 kbps serial data b2′ issued from the parallel/serial converter 64 and the 64 kbps audio data b1′ and b3′ are applied to a multiplexer 66 where one of the 64 kbps data b1′ to b3′ is selected and extracted.

In the above manner, the 32 kbps data received from the input terminal 60 are all converted into 64 kbps data and then outputted. At this time, the 32 kbps audio data are converted into 64 kbps data and then outputted while the 32 kbps non-audio data are combined and outputted as combined 64 kbps data.

During the slot assignment of the controller C20 or C21 of the cell station 20 or 21, whether each slot is used for 32 kbps audio communication or for 64 kbps data communication is informed to the exchange 30.

The operation of the transmission converter 40a of the exchange 30 for converting data to be transmitted to the cell station will now be explained.

Figure 12:
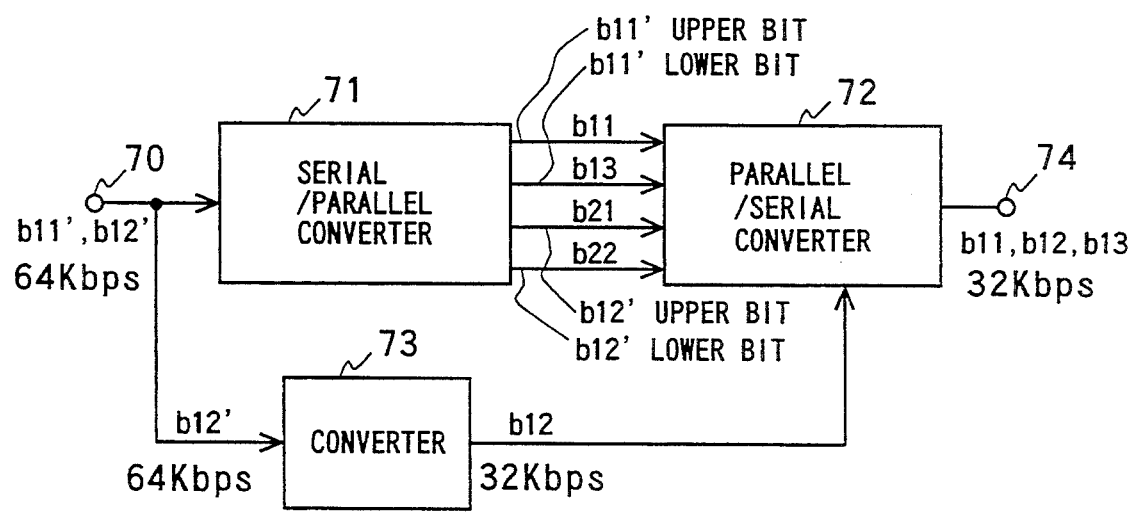
FIG. 12 illustrates a structure of a transmission converter for converting to data to be transmitted to the cell station of the private branch exchange.

Referring to FIG. 12, 64 kbps data b11′ and 64 kbps audio data b12′ received from an input terminal 70 are first applied to a serial/parallel converter 71 where the 64 kbps non-audio data b11′ is separated into an upper bit b11 and a lower bit b13 each as 32 kbps parallel data while the 64 kbps audio data b12′ is separated into an upper bit b21 and a lower bit b22 as 32 kbps parallel data. These parallel data are applied to a parallel/serial converter 72.

The 64 kbps audio data b12′ received from the input terminal 70 is also applied to a converter 73 to be compressed to 32 kbps audio data b12 therein. The 32 kbps audio data b12 is output to the parallel/serial converter 72.

The parallel/serial converter 72 selects the input parallel data, converts it to parallel data, and outputs 32 kbps serial data b11, b12 or b13 to an output terminal 74.

During the slot assignment by the controller C20 or C21 of the cell station 20 or 21, whether each slot is used for 32 kbps audio data communication or for 64 kbps non-audio data communication is informed to the exchange 30.

In the above described manner, conversion between data of 32 kbps and 64 kbps can be realized.

By the function of converting transmission/reception rate provided in the exchange 30, the exchange can serve as an interface between an ISDN network (communication channel: 64 kbps) and a portable station of 32 kbps. This transmission/reception rate converting function may be provided at the cell station.

What is claimed is:

1. A radio communication system for performing communication between a cell station and a plurality of portable stations based on time division multiple access using a plurality of carrier frequencies and a plurality of slots in one frame, wherein
the plurality of portable stations each comprises:
first reception means for receiving data at a slot assigned thereto; and
first transmission means for transmitting data at a slot assigned thereto its own portable station, and the cell station comprises:
second reception means including two receivers for alternately receiving data transmitted from the plurality of portable stations at a slot assigned thereto; second transmission means for transmitting data to the plurality of portable stations at a slot assigned thereto; and
control means for performing slot assignment for the plurality of portable stations, the slot assignment including assignment of plural slots in one frame such as to be spaced from each other by one slot or more when the cell station communicates with one of the portable stations using the plural slots in one frame.

2. A radio communication system for performing communication between a cell station and a plurality of portable stations based on time division multiple access using a plurality of carrier frequencies in which the cell station preforms communication of data of a first bandwidth to and from an exchange control device connected to a communication network, and performs communication of the data of the first bandwidth with the plurality of portable stations using plural slots in one frame allowing transmission of data of a second bandwidth, wherein the exchange control device comprises:
first conversion means for converting the data of the first bandwidth received from the communication network and to be transmitted to one of the portable stations into one or plurality of data of the second bandwidth; and
second conversion means for converting said one or plurality of the data of the second bandwidth received from the cell station from said one of the portable station into data of the first bandwidth, and
the cell station comprises:
control means, when the first conversion means converts data of the first bandwidth into a plurality of data of the second bandwidth, for assigning a plurality of slots for transmission of the plurality of data of the second band which are spaced from one another by one slot or more.

3. A radio communication system as set forth in claim 2, wherein the first conversion means compresses data of the first bandwidth into data of the second bandwidth when the data is compressible width and divides data of the first bandwidth into a plurality of data of the second bandwidth when the data is incompressible, and the second conversion means combines a plurality of data of the second bandwidth transmitted from one portable station into data of the first bandwidth in the one frame and expands the data of the second bandwidth into the data of the first bandwidth when the data is compressed data.

4. A radio communication system as set forth in claim 3, wherein the compressible data of the first bandwidth is audio data.

5. A radio communication system as set forth in claim 2, wherein the first bandwidth is 64 kbps and the second bandwidth is 32 kbps.

6. A radio communication system for performing communication between a cell station and a plurality of portable stations based on time division multiple access using a plurality of carrier frequencies and a plurality of slots in one frame, wherein the plurality of portable stations each comprises:

first reception means for receiving data at a slot assigned thereto; and first transmission means for transmitting data at a slot assigned thereto its own portable station, and the cell station comprises:

second reception means including two receivers for alternately receiving data transmitted from the plurality of portable stations at a slot assigned thereto; second transmission means for transmitting data to the plurality of portable stations at a slot assigned thereto; and control means for performing slot assignment for the plurality of portable stations, the slot assignment including assignment of plural slots in one frame such that the plural slots are positioned adjacent to each other and use same carrier frequency when the cell station communicates with one of the portable stations using the plural slots in one frame.

7. A radio communication system for performing communication between a cell station and a plurality of portable stations based on time division multiple access using a plurality of carrier frequencies in which the cell station preforms communication of data of a first bandwidth to and from an exchange control device connected to a communication network, and performs communication of the data of the first bandwidth with the plurality of portable stations using plural slots in one frame allowing transmission of data of a second bandwidth, wherein the exchange control device comprises:

first conversion means for converting the data of the first bandwidth received from the communication network and to be transmitted to one of the portable stations into one or plurality of data of the second bandwidth; and second conversion means for converting said one or plurality of the data of the second bandwidth received from the cell station from said one of the portable station into data of the first bandwidth, and the cell station comprises:

control means, when the first conversion means converts data of the first bandwidth into a plurality of data of the second bandwidth, for assigning a plurality of slots for transmission of the plurality of data of the second band which are spaced from one another by one slot or more.

8. A radio communication system as set forth in claim 7, wherein the first conversion means compresses data of the first bandwidth into data of the second bandwidth when the data is compressible width and divides data of the first bandwidth into a plurality of data of the second bandwidth when the data is incompressible, and the second conversion means combines a plurality of data of the second bandwidth transmitted from one portable station into data of the first bandwidth in the one frame and expands the data of the second bandwidth into the data of the first bandwidth when the data is compressed data.

9. A radio communication system as set forth in claim 8, wherein the compressible data of the first bandwidth is audio data.

10. A radio communication system as set forth in claim 7, wherein the first bandwidth is 64 kbps and the second bandwidth is 32 kbps.

* * * * *

UNITED STATES PATENT AND TRADEMARK OFFICE
CERTIFICATE OF CORRECTION

PATENT NO. : 5,446,739
DATED : August 29, 1995
INVENTOR(S) : Motohiro NAKANO et al.

It is certified that error appears in the above-indentified patent and that said Letters Patent is hereby corrected as shown below:

Claim 2, Column 12, Line 33, "preforms" should read --performs--.

Claim 7, Column 13, Line 35, "preforms" should read --performs--.

Signed and Sealed this

Fifteenth Day of October, 1996

Attest:

BRUCE LEHMAN

Attesting Officer        Commissioner of Patents and Trademarks